United States Patent
Anghel et al.

(10) Patent No.: US 12,319,195 B2
(45) Date of Patent: Jun. 3, 2025

(54) HEADLAMP FOR A VEHICLE

(71) Applicant: HELLA GmbH & Co. KGaA, Lippstadt (DE)

(72) Inventors: Marius Dan Anghel, Preajba (RO); Stefan Kaiser, Soest (DE); Fabian Kopka, Wadersloh (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/889,474

(22) Filed: Aug. 17, 2022

(65) Prior Publication Data

US 2022/0388444 A1 Dec. 8, 2022

Related U.S. Application Data

(63) Continuation of application No. PCT/EP2021/053174, filed on Feb. 10, 2021.

(30) Foreign Application Priority Data

Feb. 21, 2020 (DE) .................... 10 2020 104 623.5

(51) Int. Cl.
*B60Q 1/14* (2006.01)
*F21S 41/141* (2018.01)

(52) U.S. Cl.
CPC .......... *B60Q 1/1423* (2013.01); *F21S 41/141* (2018.01)

(58) Field of Classification Search
CPC ....... B60Q 1/1407; B60Q 1/04; B60Q 1/0094
See application file for complete search history.

(56) References Cited

U.S. PATENT DOCUMENTS

| | | | |
|---|---|---|---|
| 10,220,780 B2 | 3/2019 | Bengtsson | |
| 10,232,764 B2 | 3/2019 | Hagemeier | |
| 2013/0201712 A1 | 8/2013 | Fadel et al. | |
| 2014/0265838 A1* | 9/2014 | Edelmeier | H05B 45/18 315/77 |
| 2015/0377437 A1* | 12/2015 | Austerer | F21V 29/70 362/547 |
| 2016/0380172 A1* | 12/2016 | Brandl | H01L 33/486 362/544 |
| 2018/0022267 A1* | 1/2018 | Hagemeier | H05B 47/18 315/77 |

FOREIGN PATENT DOCUMENTS

| | | |
|---|---|---|
| DE | 102009023645 A1 | 12/2010 |
| DE | 102011053190 A1 | 3/2013 |
| DE | 102015105162 A1 | 10/2016 |
| DE | 102015117317 A1 | 4/2017 |
| EP | 2559936 A1 | 2/2013 |
| EP | 3398813 A1 | 11/2018 |
| KR | 20180046767 A | 5/2018 |

OTHER PUBLICATIONS

International Search Report dated Apr. 22, 2021 in corresponding application PCT/EP2021/053174.

\* cited by examiner

*Primary Examiner* — William J Carter

(74) *Attorney, Agent, or Firm* — Muncy, Geissler, Olds & Lowe, P.C.

(57) ABSTRACT

A headlamp for a vehicle, having: an LED unit for providing a headlamp beam and a control unit for controlling the LED unit. To this end, provision is made according to the invention that the LED unit has a coding resistance that is designed to identify the headlamp as a left headlamp or as a right headlamp.

6 Claims, 5 Drawing Sheets

| CODE_L [Ohm] | |
|---|---|
| 1000 | 1 |
| 2000 | 2 |
| 3000 | 3 |
| 4000 | 4 |
| 5000 | 5 |

| CODE_R [Ohm] | |
|---|---|
| 1500 | 1 |
| 2500 | 2 |
| 3500 | 3 |
| 4500 | 4 |
| 5500 | 5 |

Fig. 3

HEADLAMP FOR A VEHICLE

This nonprovisional application is a continuation of International Application No. PCT/EP2021/053174, which was filed on Feb. 10, 2021, and which claims priority to German Patent Application No. 10 2020 104 623.5, which was filed in Germany on Feb. 21, 2020, and which are both herein incorporated by reference.

BACKGROUND OF THE INVENTION

Field of the Invention

The present invention relates to a headlamp for a vehicle, in particular a motor vehicle. In addition, the invention relates to a headlamp arrangement for a vehicle, in particular a motor vehicle. Furthermore, the invention relates to a vehicle, in particular a motor vehicle.

Description of the Background Art

Headlamps for vehicles are known in principle. Depending on the position of the headlamps on the vehicle, on the left or on the right, the headlamps must be controlled differently. The respective controllers of the headlamps in this case must recognize which headlamp, a left headlamp or a right headlamp, they must control. This is especially important with headlamps that do not receive a direct turn indicator signal, but instead communicate with the vehicle-side control unit through a bus signal. In known headlamps, provision is made that the controllers of the headlamps are connected to the cable harness by different lines, for instance GND and VBAT, in order to identify the headlamp to the respective controller as a left headlamp or as a right headlamp. In this context, however, a quiescent current flows from the vehicle battery to the respective controller even when the headlamp is switched off. Moreover, the controllers need an additional connector pin on the cable harness, a control input at the controller, and an additional line (GND or VBAT) between the cable harness and the controller.

SUMMARY OF THE INVENTION

It is therefore an object of the present invention to provide a headlamp that allows improved recognition of the headlamp as a left headlamp or as a right headlamp. In particular, the object of the invention is to provide a headlamp that is constructed simply and economically, that requires little space on the printed circuit boards of an LED unit and of a control unit—which in turn can be interconnected simply—and that can be controlled simply. It is an additional object of the invention to make available an improved headlamp arrangement for a vehicle as well as a corresponding motor vehicle.

The object of the invention is attained by a headlamp for a vehicle, in particular a motor vehicle, having the features of the independent device claim, in particular from the characterizing portion. In addition, the object of the invention is attained by a headlamp arrangement for a vehicle, in particular a motor vehicle, according to the additional independent device claim. Furthermore, the object of the invention is attained by a vehicle, in particular a motor vehicle, according to the further additional independent device claim. Of course, features and details that are described in connection with individual aspects according to the invention also apply in connection with the other aspects according to the invention and vice versa, so mutual reference is or can always be made with regard to the disclosure of the individual aspects of the invention.

The invention provides a headlamp for a vehicle, having: (at least) one LED unit for providing a headlamp beam and (at least) one (headlamp-internal) control unit for controlling the LED unit. To this end, provision is made according to the invention that the LED unit has a coding resistance (what is meant here is an electronic component with an electrical resistance) that is designed to identify the headlamp as a left headlamp or as a right headlamp.

The LED unit within the meaning of the invention can have one or more LEDs, which can be arranged on an LED printed circuit board, for example. The LED unit within the meaning of the invention can be designed to provide a headlamp beam for a first lighting function, such as, e.g., turn signal light, and/or for a second lighting function, such as, e.g., daytime running light.

The control unit within the meaning of the invention can have one or more controllers.

The inventive concept resides here in that such a coding resistance that identifies the headlamp as a left headlamp or as a right headlamp is provided on an LED printed circuit board. In this case the coding resistance can be used as an already existing coding resistance on an LED printed circuit board whose electrical resistance is customized in order to uniquely identify the headlamp and in order to designate the light class for at least one lighting function of the LEDs. It is also possible within the scope of the invention to provide a separate coding resistance that is intended only to identify the headlamp as a left headlamp or as a right headlamp.

With the aid of the invention, the customary line (GND or VBAT) from the cable harness to the control unit can be dispensed with. As a result, the interconnection of the LED unit and the control unit can be simplified. A connector pin on the cable harness side is eliminated. A control input on the control unit side is eliminated as a result. Space on the printed circuit board (PCB) of the control unit can therefore also be saved. As a result, the problems relating to quiescent current in the switched-off state of the headlamp are also eliminated. In addition, the circuit for detecting whether a GND line or VBAT line is looped through to the control unit from the cable harness is eliminated as a result.

Furthermore, the invention can provide in the case of a headlamp that the coding resistance is designed as a combined coding resistance that is designed to identify at least one light class (or the efficiency) for at least one lighting function of the LED unit and to identify the headlamp as a left headlamp or as a right headlamp. Identification of the light class or of the efficiency of the LED unit for a certain lighting function is carried out with the goal of being able to set a suitable nominal current for operating the LED unit. With the aid of a combined coding resistance, the headlamp can be designed to be even simpler and more economical. This is because no changes need be made as a result to the (already existing) circuit for identifying the LED unit (i.e., for reading in the coding resistances in order to determine the nominal current values for the LED unit). An existing coding resistance for identifying the LED unit in this case can merely be assigned a modified coding resistance, which can differ from the e.g., unmodified, coding resistance of the other headlamp. In this way, the control unit can, as a function of the value of the electrical resistance at the coding resistance, read out the suitable nominal current value for the LED unit and additionally detect whether the headlamp or the control unit is installed on the left or on the right on the vehicle.

The invention can nevertheless provide in the case of a headlamp that the coding resistance is designed as a supplementary coding resistance in addition to at least one coding resistance (can also be referred to as identification resistance) of the LED unit, which is designed to identify at least one light class for at least one lighting function of the LED unit. Consequently, even though the LED unit is designed with the supplementary coding resistance, the identification resistance will nonetheless not need to be modified in this case. The circuit of the control unit for identifying the LED unit can be slightly modified in this case in order to be able to read in the supplementary coding resistance. Moreover, it is possible that the control unit does not need to be modified in order to read in the coding resistance. A special electronic component, such as an LED matrix manager, can be provided for the purpose of reading in the coding resistance.

Moreover, the invention can provide in the case of a headlamp that the control unit has a circuit or a separate electronic component for reading in the coding resistances that is designed such that at least one light class for at least one lighting function of the LED unit is identified, and the headlamp is identified as a left headlamp or as a right headlamp, on the basis of the coding resistances. In the case of a combined coding resistance for identifying the light class for at least one lighting function of the LED unit and for identifying the headlamp as a left headlamp or as a right headlamp, this can involve an already existing circuit for identifying the LED unit here. In the case of a supplementary coding resistance for identifying the headlamp as a left headlamp or as a right headlamp, this can involve a modified circuit of the control unit for identifying the LED unit here. Both variants represent simple embodiments of a headlamp within the meaning of the invention. For the purpose of reading in the coding resistance, a separate electronic component such as an LED matrix manager can still be arranged within the control unit or, instead of the circuit within the control unit, can be arranged structurally distant from the control unit, for example directly on the printed circuit board of the LED unit. It is fundamentally possible within the scope of the invention that different options can be used for evaluation of the coding resistance.

Additionally, the invention can provide in the case of a headlamp that the LED unit and the coding resistance are arranged on a printed circuit board. Consequently, the LED unit can serve as a specific LED unit for the left headlamp or the right headlamp.

In addition, the invention can provide in the case of a headlamp that the LED unit is designed to provide a first lighting function, for instance as a turn signal LED unit, and/or to provide a second lighting function, for instance as a daytime running light LED unit. The turn signal LED units and/or the daytime running light LED units are generally designed differently, for example with mirror-image contours. Consequently, the turn signal LED units and/or the daytime running light LED units are advantageously suitable for the purpose of identifying the headlamp as a left headlamp or as a right headlamp. With the aid of different LED units, the headlamp can have differently formed designs and/or multiple functional LED units.

It is also possible within the scope of the invention that the coding resistance is designed to identify the headlamp as a left headlamp or as a right headlamp and/or to identify at least one light class for at least one lighting function and/or the at least one lighting function of the LED unit. In this way, the inventive coding resistance can be used for coding multiple, for example three, pieces of information.

Furthermore, provision can be made within the scope of the invention that the control unit can have a first controller and a second controller. In advantageous fashion, the coding resistance can be designed in this case to identify the headlamp as a left headlamp or as a right headlamp and/or to identify a first mounting position of the first controller or a second mounting position of the second controller. As a result, the invention could serve for right/left detection of the headlamps as well as for mounting position detection of the controllers. In this way the inventive coding resistance can be used for coding multiple, for example three or four, pieces of information.

The invention also provides a headlamp arrangement for a vehicle, having: a headlamp, which can be designed as described above as a left headlamp, and another headlamp, which can be designed as described above as a right headlamp, wherein the coding resistance of the left headlamp is designed differently from the coding resistance of the right headlamp. The same advantages are attained with the aid of the headlamp arrangement according to the invention as were described above in connection with the headlamp according to the invention. These advantages are incorporated in full by reference in the present case.

Furthermore, the invention can provide in the case of a headlamp arrangement that the (at least one) LED unit (possibly with multiple functions) of the left headlamp and the (at least one) LED unit (possibly with multiple functions) of the right headlamp are different, for instance are mirror-image-symmetric. Consequently, the headlamps of the headlamp arrangement can be designed differently and controlled differently.

Moreover, the invention can provide in the case of a headlamp arrangement that the control unit of the left headlamp and the control unit of the right headlamp are programmed identically. Owing to the inventive coding resistances, however, the control unit can recognize which headlamp it belongs to. Therefore, the headlamps of the headlamp arrangement can be controlled accordingly.

Further, the invention provides a vehicle that has a headlamp arrangement that can be designed as described above. The same advantages are attained with the aid of the vehicle according to the invention as were described above in connection with the headlamp arrangement according to the invention and/or the headlamp according to the invention. These advantages are incorporated in full by reference in the present case.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

DETAILED DESCRIPTION

Figure 1:
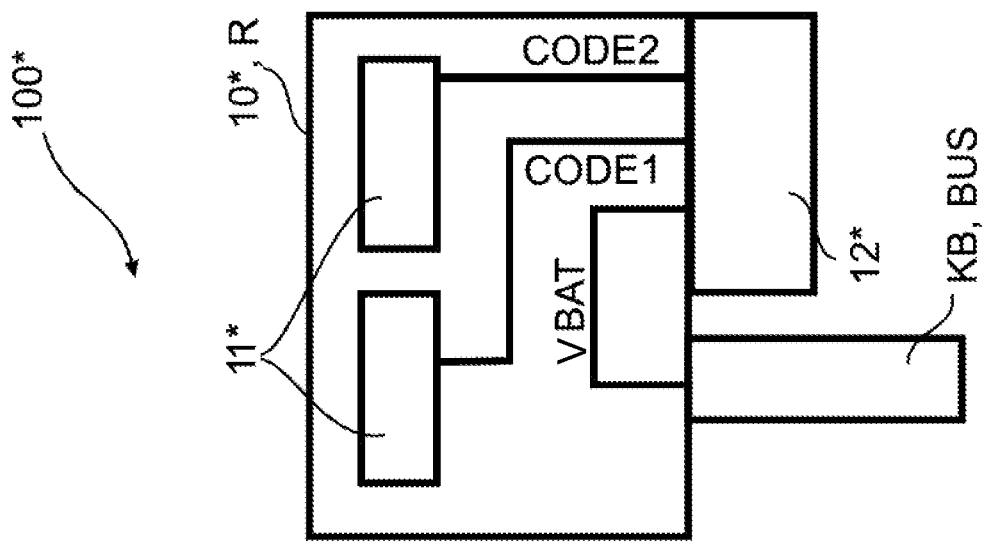
Figure 1:
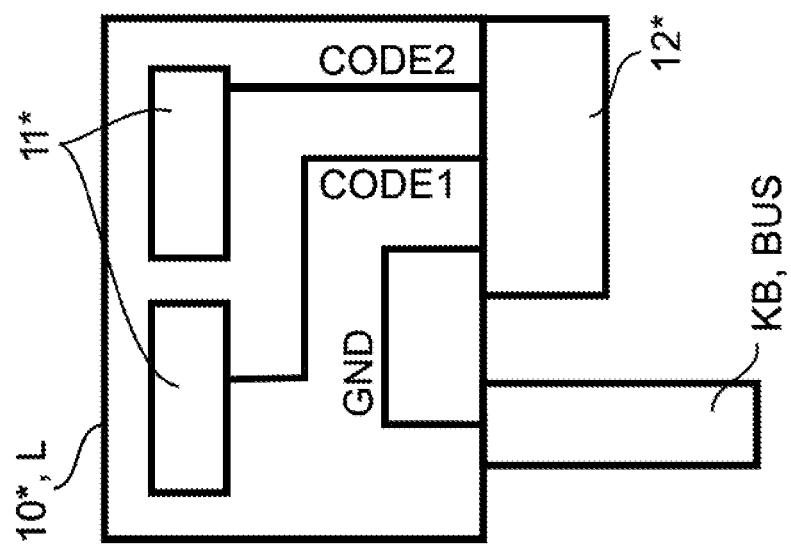
Figure 2:
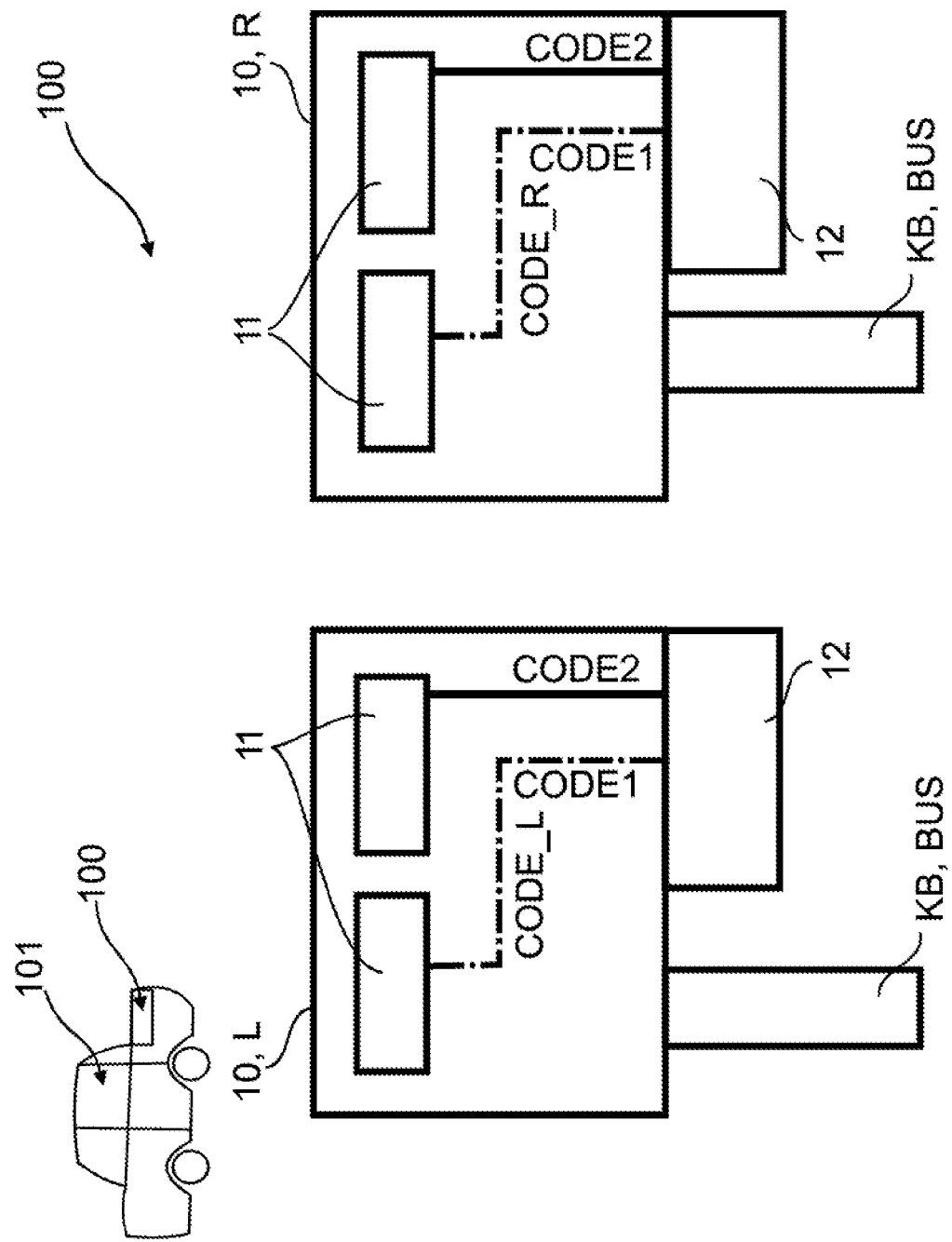
Figure 4:
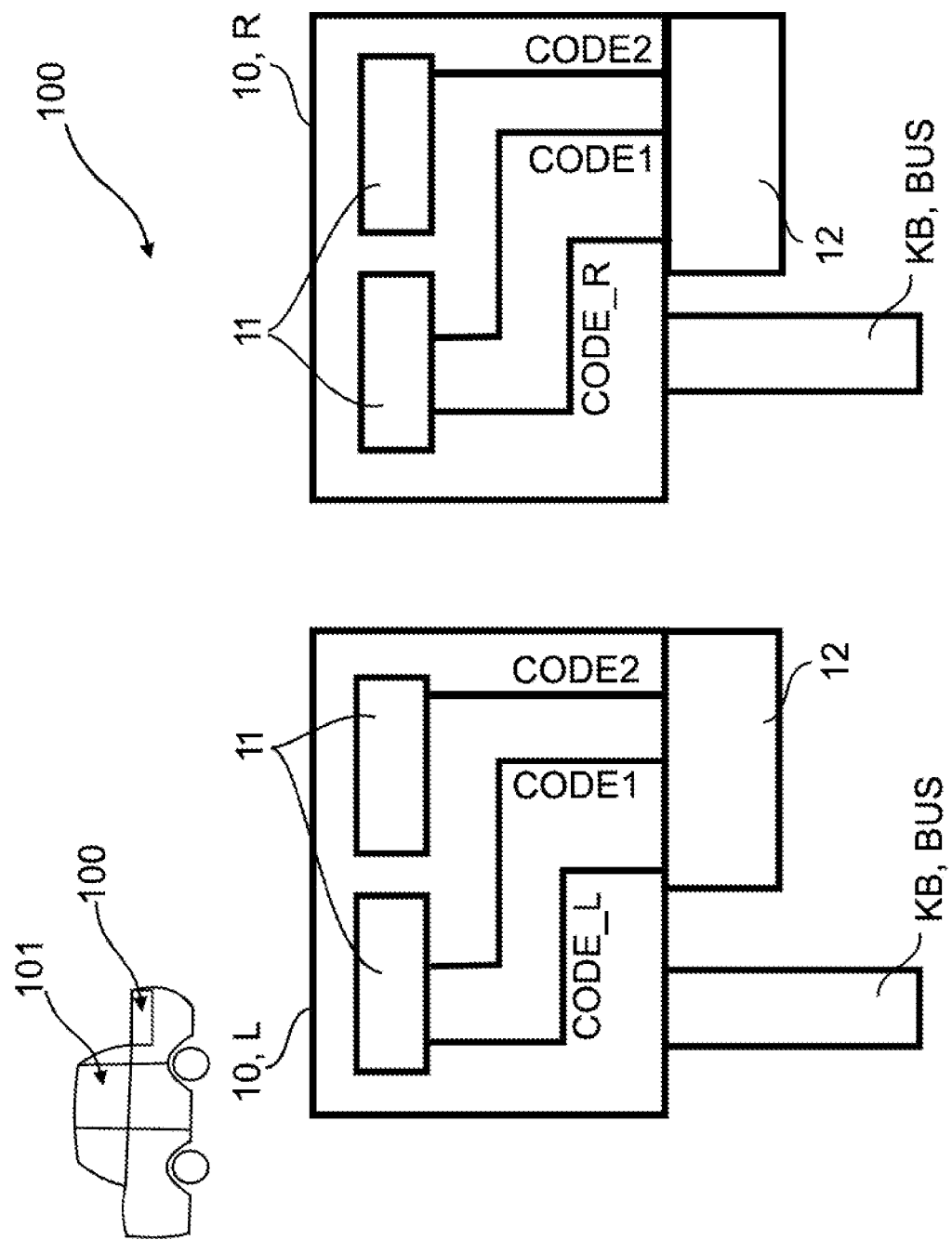
Figure 5:
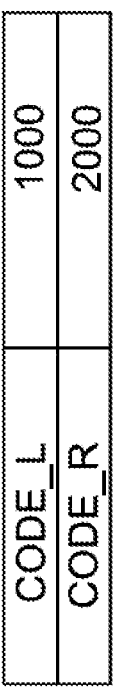

FIG. 1 shows an exemplary representation of a headlamp arrangement from the conventional art, FIG. 2 shows an exemplary representation of a headlamp arrangement according to an exemplary embodiment, FIG. 3 shows an exemplary coding resistances within the meaning of the invention, FIG. 4 shows an exemplary representation of a headlamp arrangement according to an exemplary embodiment, and FIG. 5 shows exemplary coding resistances within the meaning of the invention.

DETAILED DESCRIPTION

FIG. 1 shows an exemplary headlamp arrangement 100* from the conventional art, which has a left headlamp L* and a right headlamp R*. The headlamps 10* must be controlled differently depending on the position of the headlamps 10* on the left or on the right on the vehicle 101. The respective controllers 12* of the headlamps 10* in this case must distinguish which headlamp 10* they must control. This is important especially for the headlamps 10* that do not receive direct control signals at the turn indicators, but instead communicate with the vehicle-side control unit through a bus signal.

As FIG. 1 shows, provision is made in the case of the known headlamp arrangement 100* that the controllers 12* of the headlamps 10* are connected to the cable harness KB, BUS by different lines GND/VBAT in order to identify the headlamp 10* to the respective controller 12* as a left headlamp L* or as a right headlamp R*.

FIGS. 2 and 4 each show a headlamp arrangement 100 for a vehicle 101, in particular a motor vehicle, within the meaning of the invention, which can have two headlamps 10, namely a left headlamp L and a right headlamp R. Each headlamp 10 includes at least one LED unit 11 for providing a headlamp beam.

FIGS. 2 and 4 show two LED units 11 for each headlamp 10, for instance. An LED unit 11 can be designed in this case as, e.g., a turn signal LED unit and/or a daytime running light LED unit, and, if applicable, another LED unit 11 can serve to provide a high beam and/or low beam. It is fundamentally possible that each headlamp 10 can include one, two, or more LED units 11, wherein different functions can be provided within individual LED units 11 in order to provide a desired appearance and/or functionality at the headlamp arrangement 100 for a vehicle 101.

Every headlamp 10 within the scope of a headlamp arrangement 100 according to FIGS. 2 and 4 includes one control unit 12 each for controlling the LED unit(s) 11.

According to the invention, and as FIGS. 2 and 4 show, the LED unit 11 has a coding resistance CODE_L, CODE_R (what is meant here is an electronic component with a certain electrical resistance). The coding resistance CODE_L, CODE_R is designed to identify the headlamp 10 as a left headlamp L or as a right headlamp R to the control unit 12.

According to the invention, and as FIGS. 2 and 4 indicate, such a coding resistance CODE_L, CODE_R that designates the headlamp 10 as a left headlamp L or as a right headlamp R is provided on an LED printed circuit board.

According to FIG. 2, the coding resistance CODE_L, CODE_R can be used as an already existing coding resistance CODE1, CODE2 on an LED printed circuit board whose electrical resistance is customized (see FIG. 3) in order to uniquely identify the headlamp 10 as a left headlamp L or a right headlamp R and also in order to designate the light class 1, 2, 3, 4, 5 for at least one lighting function of the LEDs within the LED unit 11.

According to FIG. 4, a separate coding resistance CODE_L, CODE_R can be provided that is intended only to identify the headlamp 10 as a left headlamp L or as a right headlamp R.

As can be discerned on the basis of FIGS. 2 and 4, with the aid of the invention the customary line GND/VBAT of FIG. 1 from the cable harness KB, BUS to the control unit 12 can be dispensed with. As a result, the interconnection of the LED unit 11 and the control unit 12 as a whole can be simplified. A connector pin on the cable harness KB, BUS side can thus be eliminated. A control input on the control unit 12 side can thus be eliminated. Space on the printed circuit board (PCB) of the control unit 12 can therefore also be saved. Furthermore, the problems relating to quiescent current in the switched-off state of the headlamp 10 can be overcome as a result. In addition, a special circuit for detecting whether a GND line or VBAT line is routed to the control unit 12 from the cable harness BUS is eliminated with the aid of the invention.

FIG. 2 shows the inventive coding resistance CODE_L, CODE_R as a combined coding resistance that is designed to identify a light class 1, 2, 3, 4, 5 or the efficiency for at least one lighting function of the LED unit 11 (see FIG. 3). In addition, the combined coding resistance is designed to identify the headlamp 10 as a left headlamp L or as a right headlamp R.

FIG. 4 shows the inventive coding resistance CODE_L, CODE_R as a supplementary coding resistance in addition to a coding resistance CODE1, CODE2 of the LED unit 11. The coding resistance CODE1, CODE2 of the LED unit 11 in this case is designed to identify the light class 1, 2, 3, 4, 5 for at least one lighting function of the LED unit 11.

Within the scope of the invention, it is fundamentally possible in connection with FIG. 2 or FIG. 4 that one, two, or more lighting functions can be provided with the aid of one LED unit 11. In this case, the coding resistance CODE_L, CODE_R can advantageously also be used for coding multiple, for example three, pieces of information: right/left relating to the headlamp 10, a corresponding light class of a first lighting function and/or a corresponding light class of a second lighting function and therefore also of the lighting function of the respective LED units 11. For example, a printed circuit board can have with [sic; "with" should be omitted] orange LEDs for the turn indicator and white LEDs for the daytime running light, which can have different light classes 1, 2, 3, 4, 5. A corresponding light class 1, 2, 3, 4, 5 must be coded for the LEDs of both lighting functions.

It is furthermore possible that the control unit 12 can have two controllers. The coding resistance CODE_L, CODE_R can advantageously be designed in this case to identify the headlamp 10 as a left headlamp L or as a right headlamp R and/or to identify a first mounting position of a first controller or a second mounting position of a second controller. As a result, a right/left detection of the headlamps 10 as well as a mounting position detection of the controllers can be performed. In this case, too, the inventive coding resistance CODE_L, CODE_R can be used for coding multiple, for example three or four, pieces of information: right/left relating to the headlamp 10, a first or a second mounting position of the controllers, a corresponding light class of at least one lighting function of the LED unit 11 and therefore also the lighting function of the LED unit 11.

FIGS. 3 and 5 schematically show, using exemplary numerical examples, how the control unit 12 can detect the light class 1, 2, 3, 4, 5 for at least one lighting function of the LED unit 11 depending on the value of the electrical resistance at the coding resistance CODE_L, CODE_R, whether the headlamp 10, and thus the control unit 12, is mounted on the left or on the right on the vehicle 101 [sic; should perhaps read something like: " . . . how the control unit 12 can detect the light class 1, 2, 3, 4, 5 for at least one lighting function of the LED unit 11, and can detect whether the headlamp 10, and thus the control unit 12, is mounted on the left or on the right on the vehicle 101, depending on the value of the electrical resistance at the coding resistance CODE_L, CODE_R"]. The light classes 1 to 5 are shown merely by way of example. It is also possible for only three or, if necessary, even more than five light classes to exist.

Within the scope of the invention, the LED unit(s) and the coding resistance CODE_L, CODE_R can be arranged on a shared printed circuit board.

The LED unit 11, which has the coding resistance CODE_L, CODE_R within the meaning of the invention, can be designed as a turn signal LED unit and/or the daytime running light LED unit [sic; should probably say "a daytime running light LED unit"]. The turn signal LED units and/or the daytime running light LED units generally are designed differently, for example with mirror-image contours, so that the turn signal LED units and/or a daytime running light LED units [sic; should say "the daytime running light LED units"] can advantageously serve to identify the headlamp 10 as a left headlamp L or as a right headlamp R with the aid of a coding resistance.

As FIGS. 2 and 4 indicate, the invention according to the first aspect provides the headlamp 10 having the coding resistance CODE_L, CODE_R within the meaning of the invention, according to the second aspect provides the headlamp arrangement 100 having two corresponding headlamps 10, and according to the third aspect provides a vehicle 101 having a corresponding headlamp arrangement 100.

The above description of the figures describes the present invention solely within the framework of examples. Individual features of the embodiments can of course be combined freely with one another, insofar as is technically appropriate, without departing from the scope of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlamp for a vehicle, the headlamp comprising:
an LED unit to provide a headlamp beam;
a control unit to control the LED unit,
wherein the LED unit has a coding resistance that is designed to identify, to the control unit, whether the headlamp is a left headlamp or a right headlamp, and
wherein the control unit has a first controller and a second controller, wherein the coding resistance is further designed to identify a first mounting position of the first controller or a second mounting position of the second controller.

2. A headlamp arrangement for a vehicle, the headlamp arrangement comprising:
a first headlamp that is a left headlamp, the first headlamp having a first LED unit and a first control unit to control the first LED unit, the first LED unit having a first coding resistance to identify, to the first control unit, that the first headlamp is the left headlamp; and
a second headlamp that is a right headlamp, the second headlamp having a second LED unit and a second control unit to control the second LED unit, the second LED unit having a second coding resistance to identify, to the second control unit, that the second headlamp is the right headlamp,
wherein the first coding resistance of the left headlamp is designed differently from the second coding resistance of the right headlamp.

3. The headlamp arrangement according to claim 2, wherein the first LED unit of the left headlamp and the second LED unit of the right headlamp are different or are designed with mirror-image symmetry.

4. The headlamp arrangement according to claim 2, wherein the first control unit of the left headlamp and the second control unit of the right headlamp are programmed identically.

5. A vehicle comprising the headlamp arrangement according to claim 2.

6. The headlamp according to claim 2, wherein the first coding resistance of the first LED unit is provided on a first LED printed circuit board of the first LED unit, the first coding resistance of the first LED unit having a first electrical resistance that identifies, to the first control unit, that the first headlamp is the left headlamp, and
wherein the second coding resistance of the second LED unit is provided on a second LED printed circuit board of the second LED unit, the second coding resistance of the second LED unit having a second electrical resistance that identifies, to the second control unit, that the second headlamp is the right headlamp.

* * * * *